Sept. 3, 1940.     J. PLEBANSKI     2,213,591
SELECTIVE CIRCUITS
Filed Aug. 5, 1936     3 Sheets-Sheet 1
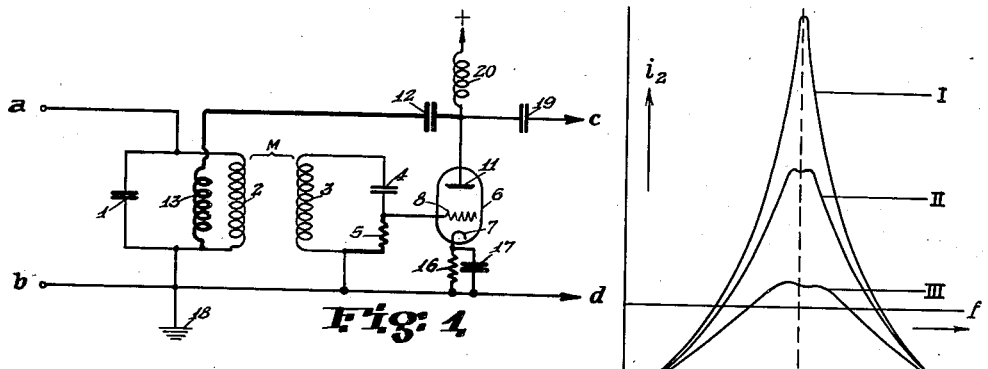
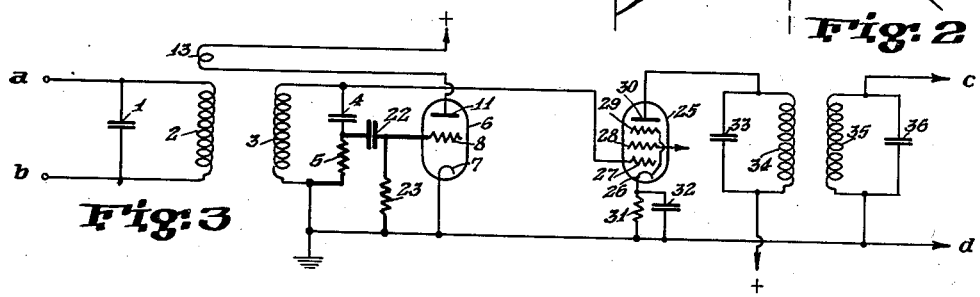
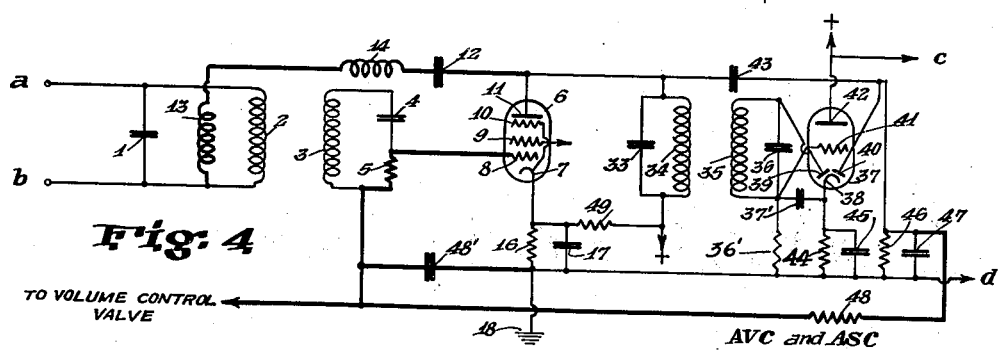
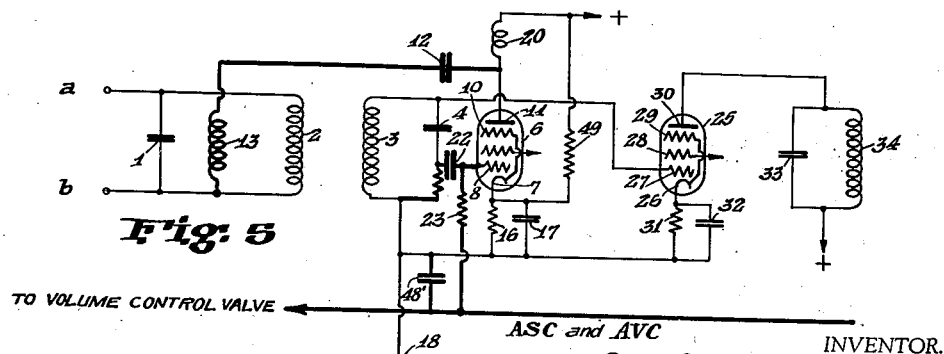
INVENTOR.
Jozef Plebanski
BY
ATTORNEY.

Sept. 3, 1940.  J. PLEBANSKI  2,213,591
SELECTIVE CIRCUITS
Filed Aug. 5, 1936  3 Sheets-Sheet 2
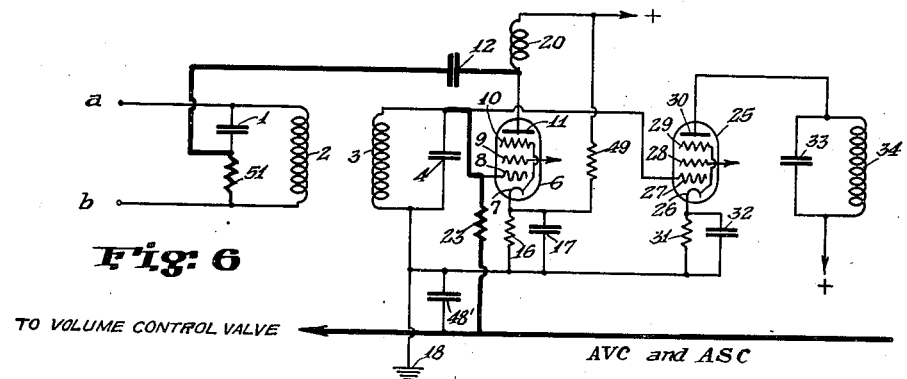
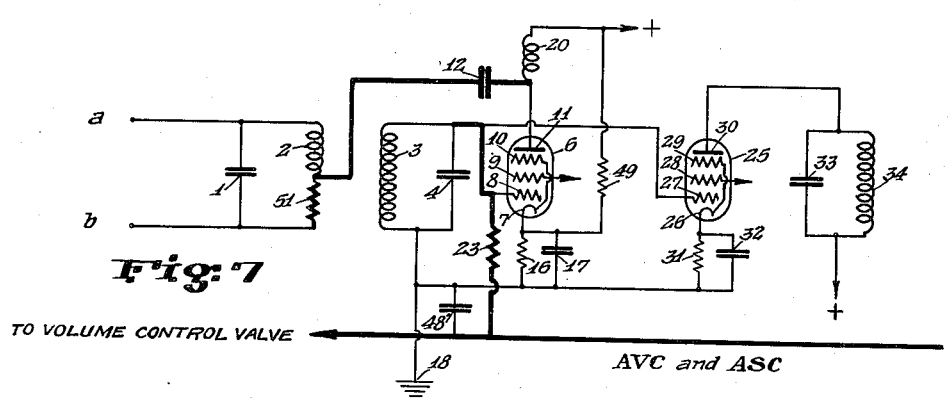
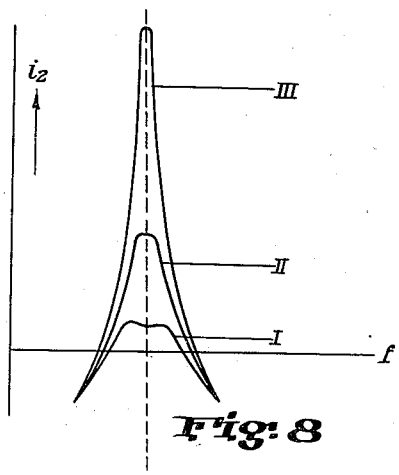
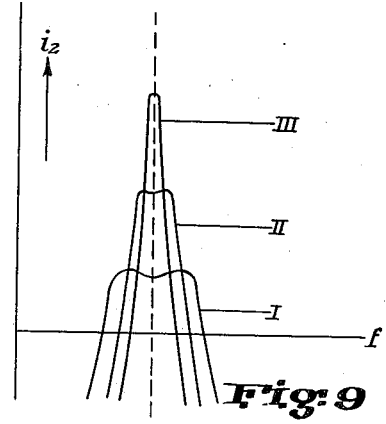
INVENTOR.
Jozef Plebanski
BY
ATTORNEY.

Sept. 3, 1940. J. PLEBANSKI 2,213,591
SELECTIVE CIRCUITS
Filed Aug. 5, 1936 3 Sheets-Sheet 3

INVENTOR.
Jozef Plebanski
BY
ATTORNEY.

Patented Sept. 3, 1940

2,213,591

UNITED STATES PATENT OFFICE 2,213,591

SELECTIVE CIRCUITS

Jozef Plebanski, Warsaw, Poland, assignor to Radio Patents Corporation, New York, N. Y., a corporation of New York Application August 5, 1936, Serial No. 94,389
In Poland October 7, 1935

2 Claims. (Cl. 179—171)

The present invention relates to improvements for and methods of operating selective circuits, more particularly circuits for transmitting or receiving modulated carrier signalling energy.

An object of the invention is to provide a system for and a method of simultaneously regenerating double tuned selective circuits or band selectors.

Another object of the invention is the provision of means for and a method of varying the apparent mutual reactance of two or more coupled circuits by means of regeneration.

Another object of the invention is to provide a selectivity control system adjustable by purely electrical means such as by variation of an electric current or potential.

Another object is the provision of means for and a method of varying the mutual reactance between coupled circuits purely electrically such as by varying an electric current or potential.

A further object of the invention is the provision of an automatic selectivity control or variable band pass selector for broadcast receivers or the like whereby the band width of a selective circuit or system is increased or the selectivity decreased as the signal strength increases and vice versa in such a manner as to provide high selectivity or narrow band width and decrease of background noise for weak or distant signals, and to provide low selectivity or a broad band width and improved fidelity and quality for strong or local signals.

Another object of the invention is the provision of a combined automatic selectivity and gain control system for a receiver of modulated carrier signals whereby both gain and selectivity are increased or decreased simultaneously with decrease and increase of signal strength respectively, in such a manner that for weak and distance signals the gain or amplification is automatically increased to provide adequate output signal volume and high selectivity to compensate for the increase of background noise and other interference due to increased amplification of the receiver.

Another object of the invention is the provision of a combined automatic selectivity and gain control system whereby the selectivity is increased at a desired rate relative to the increasing gain or decreased signal strength.

Another object is the provision of a constant frequency oscillator of simple design and high stability producing a pure oscillating current substantially free from higher harmonics.

These and further objects of the invention will become more apparent from the following detailed description taken with reference to the accompanying drawings illustrating various examples of circuits embodying the novel inventive features.

In the drawings, wherein similar reference numerals identify like parts throughout the different views:

Figure 1 shows a fundamental circuit embodying the invention.

Figure 2 represents a number of resonance curves illustrating the operation of the circuit according to Figure 1.

Figure 3 is a modification of a circuit shown in Figure 1 embodying a separate reaction or selectivity control valve.

Figure 4 is a further modification of the invention applied to automatic selectivity control.

Figures 5, 6 and 7 are other modifications of automatic selectivity and gain control circuits.

Figures 8 and 9 represent resonance curves illustrating the function of the selectivity control system.

Figure 10:
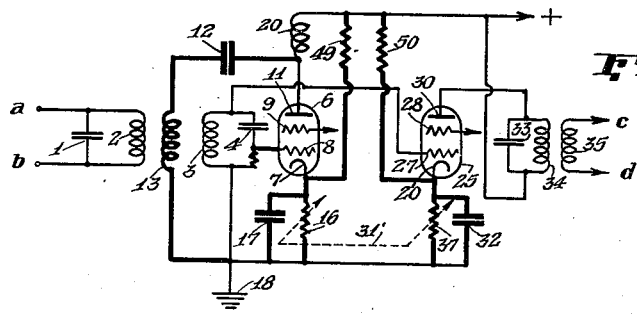
Figure 10 shows a further modification of a combined manually adjustable selectivity and gain control system according to the invention.

The selective circuits illustrated and described hereinafter may be employed in connection with any type of modulated carrier system such as a radio receiver, wired wireless apparatus, etc., or any other system where variable mutual coupling is desirable. In the drawings only those parts have been illustrated which are necessary for an understanding of the invention. For this purpose the input terminals to the system have been indicated by the characters $a$, $b$ and the output terminals by the characters $c$ and $d$. Thus, for instance, the circuits described may constitute a high frequency or intermediate frequency stage in a standard superheterodyne receiver or any other part of a similar apparatus for selective transfer of modulated oscillatory energy.

Referring to the basic circuit according to Figure 1, I have shown a tuned transformer having a primary 2 shunted by a condenser 1 and a secondary 3 shunted by a condenser 4 in series with a resistance 5. The primary is connected across the input terminals $a$, $b$ which may be the output of a mixer stage in a superheterodyne receiver or any other suitable apparatus. The lower terminal of the transformer primary is connected to ground 18 in accordance with customary practice. The potential drop developed across the resistance 5 is applied to the grid-cathode path of an amplifying valve 6 of any suitable type in the example shown a triode having a cathode 7, grid 8, and anode 11 and having a biasing resistance 16 shunted by a condenser 17 inserted in the cathode or ground lead to provide suitable grid biasing potential in accordance with well known practice in the art. The potential variations developed in the output circuit of the valve 6 may be applied in any suitable manner such as through a coupling condenser 19 to an output circuit such as a further stage of amplification or a detector, connected to the output terminals c, d. The anode 11 is connected in the usual manner to the positive pole of a high tension source indicated by the plus sign through a high frequency choke coil 20. I have furthermore shown a regenerative or feedback circuit connected between anode 11 and the negative or ground terminal including a condenser 12 and an induction or tickler coil 13 in inductive coupling relation with the primary 2.

It will be noted that the circuit as described and shown in Figure 1 substantially differs from the conventional regenerative systems by the fact that the control potential difference for the regenerative or amplifying valve 6 is derived from the resistance 5 in place of the usual supply of the control potential from the opposite ends of the secondary 3 of the resonant transformer. In the latter case it is understood that it is not possible to regenerate both circuits 1, 2 and 3, 4 by reaction from the anode or output circuit due to the fact that if both circuits are tuned exactly to resonance the currents therein will be 90° out of phase with each other. Thus, in the case of orthodox regeneration (grid-cathode path of valve 6 connected across the opposite ends of transformer secondary 3) the reaction currents induced in the circuit 1, 2 will be in phase quadrature with regard to the current flowing in the circuit and consequently no regenerative effect will take place. On the other hand, in a system as described wherein the control potential for the reaction valve 6 is derived from the resistance 5 in series with either of the reactances of the circuit, in the example shown, the tuning condenser 4, both circuits will be simultaneously regenerated and the selectivity and gain of the system increased accordingly.

The following theoretical analysis is further illustrative of the phenomena taking place in an arrangement of this type. The following are the differential equations for the circuits 1, 2 and 3, 4, well understood by those skilled in the art.

Equation for circuit 1, 2:

(a) $\quad i_1 R_1 + L_1 \frac{di_1}{dt} - \frac{1}{C_1}\int i_1 dt + M\frac{di_2}{dt} \pm KR_2\frac{di_2}{dt} = E \sin \omega t$ Equation for circuit 3, 4:

(b) $\quad i_2 R_2 + L_2 \frac{di_2}{dt} - \frac{1}{C_2}\int i_2 dt + M\frac{di_1}{dt} = 0$ wherein $i_1$ represents the current in the circuit 1, 2; $R_1$ represents the ohmic or loss resistance in the circuit 1, 2; $L_1$ represents the inductivity of the primary 2; $C_1$ represents the capacity of condenser 1; M represents the mutual inductance between the circuits 1, 2 and 3, 4, 5; $i_2$ represents the current in the circuit 3, 4, 5; $L_2$ represents the self-inductance of the secondary 3; $C_2$ represents the caacity of condenser 4; $R_2$ the value of the resistance 5 plus any additional loss resistance in the circuit; and K is a coefficient depending on the characteristic of the valve 6, the value of the reaction condenser 12 and the degree of coupling between the reaction self-inductance 13 and the primary 2.

The meaning of term $$KR_2\frac{di_2}{dt}$$

is further explained as follows: The potential applied to the grid of valve 6 is determined by the potential drop developed across the resistance 5 ($R_2$) and is equal to $R_2 i_2$. The anode current of the valve 6 is equal to $i_a =$ to $SR_2 i_2$ wherein S is a coefficient depending on the operating characteristic of the valve which for the sake of simplicity may be assumed to be linear. The potential induced by the reaction of feedback coil 13 in the primary 2 of the tuned transformer is then found as follows:

$$p = M_a \frac{di_a}{dt} = M_a S R_2 \frac{di_2}{dt} = K R_2 \frac{di_2}{dt}$$

wherein $M_a$ represents the coupling coefficient between the reaction coil 13 and primary 2, and $i_a$ is the anode current of the valve.

The two terms in the first Equation (a):

$$M\frac{di_2}{dt} \pm KR_2\frac{di_2}{dt}$$

may be contracted to $$(M \pm KR_2)\frac{di_2}{dt} = X\frac{di_2}{dt}$$

and show that the reaction system acts to increase or decrease the apparent coefficient of mutual inductance M or any other mutual reaction common to the circuits 1, 2 and 3, 4 by an amount equal to $\pm KR_2$.

Further analysis shows that in the case of resonance the currents in the two circuits will be as follows:

$$i_1 = \frac{(E \sin \omega t)R_2}{R_1 R_2 \pm MX\omega^2} \; ; \; i_2 = \frac{(E \sin \omega t)\mu\omega}{R_2 R_1 \pm MX\omega^2}$$

From the above it is seen that in a reaction system as described, the resistance of the primary or input circuit 1, 2 is reduced by an amount $MX\omega^2$ provided the proper sign for the coefficient K determined by the phase of the currents in the coil 13 and that simultaneously the resistance of the circuit 3, 4 is decreased. For $$R_1 R_2 = MX\omega^2$$

and with the proper adjustment of polarity of the feedback currents by the proper connection of the coil 13, both resistances of the circuits 1 and 2 will become simultaneously zero and the currents therein theoretically infinite. This case corresponds to maximum selectivity and maximum gain of the double tuned resonance system. If $MX\omega^2$ is greater than $R_1 R_2$ the resistance becomes negative and the circuit starts to oscillate. Double tuned oscillating circuits of this type have great advantages over the orthodox single regenerative circuits due among other advantages to a substantial reduction of harmonics on account of the filtering action and attenuation effect of the double tuned system and also to the fact that the grid swing of the valve 6 is less than the voltage amplitude produced by the condenser 4 as the control voltage is derived from the resistance 5 in the manner as described being only a fraction of the total potential developed in the circuit. Experiments have proven that the oscillating stability and purity of the currents obtained with a system of this type is extremely high.

The selectivity and gain in an arrangement described depends on the degree of regeneration and may be varied within extremely wide limits by adjusting the degree of regeneration or amount of feedback by means of any of the known methods. Thus for instance, the degree of regeneration may be controlled by varying the reaction condenser 12 or by adjusting the coupling between the reaction inductance 13 and tuned transformer primary 2 or alternatively by varying the slope of the operating characteristic or mutual conductance of the valve 6 such as by adjusting the anode potential, the control grid or screen grid potential, the grid bias or by varying the biasing resistance 16 in the cathode lead. As is understood, any type of amplifying valve may be used for the purposes of the invention, such as a triode valve shown in the drawings, a screen grid valve, pentode, or equivalent amplifying device. Valves of the so-called variable mu type have been found to be especially suited for the purpose of the invention for reasons well understood.

In Fig. 2 I have shown a few resonance curves illustrating the variation of gain and selectivity dependent on the degree of regeneration adjusted by any one of the means mentioned before. Curve I corresponds to high gain and selectivity obtained by a high degree of regeneration. Curves II and III correspond to gain and selectivity for decreased regeneration. With the proper design of the circuit constants it is possible to secure a band pass effect such as shown by curves II and III.

The selectivity and gain control may be effected either manually or automatically in a similar manner as known with automatic volume control systems used in radio and similar apparatus and described in detail hereafter. A feature of the invention is the fact that the range of variation of selectivity and gain is extremely high especially when using a variable mu type valve with grid bias control. Experiments have shown that the obtainable gain ratio may be as high as 50 db.

The inventive circuit as described has special application for broadcast receivers to provide combined automatic selectivity and gain control for increasing the fidelity of reproduction of local stations and decreasing background noise incident to the reception of distant stations. Radio broadcasting signals are generally transmitted on a carrier wave having two side bands of modulation which are about five kilocycles apart in width on either side of the carrier. Under present radio broadcast operating conditions, the different carrier frequencies are allocated at various positions throughout the broadcast frequency range 10 kilocycles apart and in many instances the side band frequencies of one signal channel either overlap those of an adjacent signal channel or else closely encroach upon them. In either case, it is difficult when tuning a radio receiver to a desired signal in one such channel substantially to eliminate interference due to signals in adjacent channels particularly when such interfering signals are intercepted by the antenna with a strength comparative to or exceeding that of the desired signal. In addition to interfering signals, static, or other so-called background noise may prevent quiet operation. Quiet operation during reception under such circumstances requires that the selective system shall select a sufficiently narrow band of modulation frequencies to prevent appreciable passage of interfering signals and noise. Narrowing the selected band on the other hand tends to impair the fidelity of reception of the signals, such as voice, music and the like since the higher side bands corresponding to the higher audio frequencies of modulation are suppressed. Accordingly it is desirable that the selected band width be allowed to remain narrow only when excessive interfering signals or noise are present but in their absence the selecting system should be adjusted to freely admit and pass all of the received side bands of the desired signals.

Arrangements of the type according to the invention are well suited to secure manual or automatic gain and selectivity control of this character. The invention basically differs from methods of selectivity control heretofore suggested in the art utilizing a change of the relative position or degree of coupling of the coils 2 and 3 according to Figure 1 whereby maximum selectivity corresponds to minimum gain and vice versa. In an arrangement according to the invention on the other hand maximum selectivity corresponds to maximum gain in the valve stage or in other words, weak and distant signals are amplified to a sufficient level to insure adequate output volume in the loud speaker or equivalent translating device while at the same time the selectivity is at its highest, thus reducing or eliminating background noise and other interference. On the other hand, with very strong signals the gain or amplification is low and the band width of the receiver substantially widened so as to admit substantially all of the audio modulating frequencies, resulting in great increase of the fidelity and improvement of the quality of reproduction.

Referring to Figure 3 of the drawings, this differs from Figure 1 by the provision of a separate reaction and amplifying valve. The reaction valve 6 is connected in a manner similar as described by Figure 1 and a separate amplifying valve 25 of the pentode type having a cathode 26, control grid 27, screen grid 28, suppressor grid 29 and anode 30 is shown directly controlled in the orthodox fashion (grid-cathode path connected across opposite ends of secondary 3) from the input circuit 3, 4, 5. Items 31 and 32 are a voltage drop resistor and by-pass condenser, respectively, inserted in the cathode-to-ground lead of the valve to provide proper grid biasing potential in a known manner. The output current variations of the valve 25 may be applied to a further utilization or output circuit, in the example shown, through a tuned transformer having a primary 34 shunted by a condenser 33 and a secondary 35 shunted by a condenser 36 and connected to the output terminals c, d.

Referring to Figure 4, this illustrates the invention as embodied in an automatic selectivity and gain control system for a radio receiver or the like of the type described above. The circuit comprising the input selector and reaction valve 6 is substantially similar to that shown in Figure 1. In addition, the output of the valve 6 is fed to a composite duo-diode triode amplifier valve 37 of known construction having a common cathode 38, rectifying anodes 39 and 40, control grid 41 and amplifier anode 42. The output circuit of the valve 6 includes a resonant transformer having a primary 34, shunted by condenser 33 and a secondary 35 shunted by condenser 36. The secondary 35 is connected on the one hand to the anode 39 and on the other hand to the control grid 41. The lower terminal of the secondary 35 is connected to the cathode 38 through a resistance 36' shunted by a by-passing condenser 37' to complete the direct current grid circuit. The cathode 38 is connected to ground or negative terminal 18 through a resistance 44 shunted by a condenser 45 to provide the necessary grid biasing potential for the amplifying section of the tube 37. The anode of the tube 6 is furthermore shown coupled to the other diode anode 40 through a coupling condenser 43 and the anode 40 is further connected to ground or negative terminal through a resistance 46 shunted by a condenser 47. Item 49 represents a voltage drop or potentiometer resistance connected between the positive pole of the anode potential source and the cathode of tube 6, and item 48' represents a by-pass condenser connected between the lower end of the secondary 3 and ground.

Arrangements of the type according to Figure 3 with a separate reaction valve have the advantage that the incoming signal oscillations are prevented from directly passing through the reaction self-inductance 13 to other parts of the system connected to the output circuit. If however a combined amplifying and reaction valve is used as shown in Figures 1 and 4 and some of the subsequent illustrations, the receiving signals may be prevented from entering the feedback circuit by a choke coil 14 inserted in the latter.

The high frequency oscillations supplied from the output of tube 6 are thus rectified by the double diode section of tube 37 and the rectified currents amplified by the amplifier section for further utilization in a known manner such as in an audio frequency amplifier of a superheterodyne receiver. In addition, a direct current potential drop is developed across the resistance 46 varying in accordance with the incoming carrier or signal field strength in a manner well known in automatic volume control systems. The potential variations thus developed are applied through a voltage drop resistance 48 directly to the control grid 8 of the reaction valve 6 in such a manner as to control the degree of regeneration and accordingly the gain and selectivity of the circuits 1, 2 and 3, 4 in accordance with varying signal strength or variations of the unmodulated or carrier component of the modulated oscillating energy fed to the input circuit. The automatic volume control (AVC) and automatic selectivity control (ASC) potential may be applied to further stages for volume or selectivity control such as to a preceding high frequency stage in the case of a superheterodyne receiver. Any other type of rectifier or diode may be provided to secure an AVC or ASC potential in the system described.

The operation of the circuit according to Fig. 4 will be readily understood from the foregoing. If a strong signal is received, a higher negative bias is developed across the resistance 46 and applied to the valve 6, which is preferably of the variable mu type thus decreasing both gain and selectivity in a manner described. The selectivity curves for various biasing potentials considering the all-over resonance characteristics of the high or intermediate frequency are shown in Figure 8. As pointed out, such an automatic selectivity and gain control arrangement represents a refinement which is very useful in all types of broadcast and similar receivers since it makes the tuning more pleasant even in the absence of so-called silent tuning devices or inter-carrier noise suppressors on account of a substantial reduction of background noise as described before. Moreover, the receiver adjusts itself automatically for optimum selectivity and high fidelity so that fading distant signals cannot be drowned out by an adjacent stronger signal and a strong signal is not subject to side band cutting on account of automatic tightening of the frequency response or band pass characteristic of the receiver.

Referring to Fig. 5, this shows a modification of the circuit of Figure 4 employing a separate reaction valve similar as shown in Figure 3. The rest of the circuit is substantially identical to Figure 4 except for the omission in the drawing of means for producing the AVC and ASC potential which may be similar as shown in Figure 4.

Figures 6 and 7 are modifications of the circuit according to Figure 5. These circuits differ from Figure 5 by the direct coupling of the secondary 3 of the resonant input transformer to the grid-cathode path of the reaction valve in the orthodox manner while the 90° phase shift of the reaction current is obtained by the connection of the feedback circuit from the anode through feedback condenser 12 directly to the junction of a resistance 51 and condenser 1 connected in series across the primary 2 (Figure 6). Figure 7 is substantially similar to Figure 6 and differs merely by the connection of the feedback circuit from the anode through feedback condenser 12 to the junction between resistance 51 and primary inductance 2 connected in series across the primary tuning condenser 1.

Figure 11:
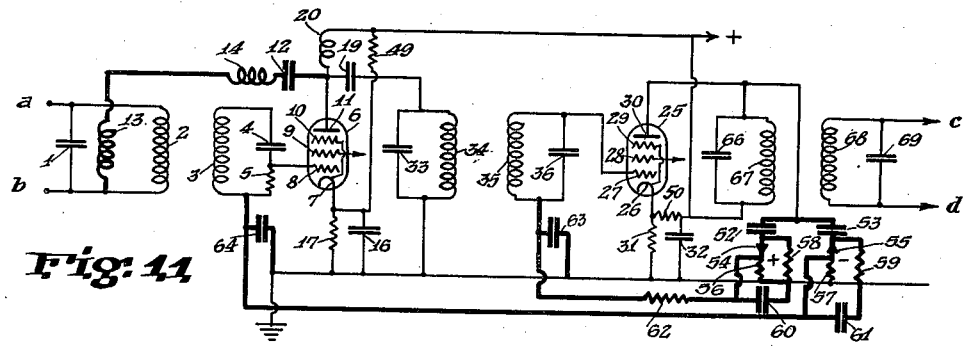
Figure 11 represents a similar system to Figure 10 adapted for automatic operation.

If it is desirable to increase the selectivity for weaker signals to a still higher degree than is possible with the arrangement previously described, a system for either manual control according to Figure 10 or for automatic operation according to Figure 11 may be employed.

In Figure 10 the valve 6 is used as a reaction valve in the manner described before to provide simultaneous selectivity and gain control by varying the biasing resistance 16 in the cathode lead while the valve 25 serves as a pure volume control valve of orthodox type by variation of the biasing resistance 37. Both variable resistances 16 and 37 are shown to be coupled by any suitable connecting mechanism indicated at 31' to afford uni-control of both valves. The design and adjustment of the resistors 16 and 31 is such that when the mutual conductance of the valve 6 is increased the mutual conductance of the valve 25 is decreased and vice versa. In this manner selectivity curves are obtained as shown in Figure 9. An arrangement of this type may be used and adjusted in such a manner as to function as a pure selectivity control system whereby the opposing gain produced by the tube 25 substantially compensates the gain produced by the reaction valve 6 in addition to the variation of selectivity. Item 50 is a voltage drop or potentiometer resistance connected between cathode and anode of the valve 25.

Figure 11 illustrates a system similar to that showing Figure 10 but adapted for automatic selectivity and gain control. The valve 6 serves as an amplifier and reaction valve and the valve 25 acts as an amplifier similar as shown in the previous figures having a resonant output transformer with a primary 67 shunted by a condenser 66 and a secondary 68 shunted by a condenser 69 inserted in the anode circuit for feeding the output current variations to a succeeding circuit connected to terminal *c, d*. In addition, the circuit according to Figure 11 includes an arrangement for producing a pair of steady control potentials of opposite polarity varying in accordance with changes of the carrier amplitude or receiving signal field strength. In the example shown this arrangement comprises a pair of rectifying circuits connected across the anode 30 of valve 25 and negative or ground terminal, each circuit comprising a condenser 52 or 53, a rectifier 54 or 55 and a resistance 56 and 57, respectively.

As indicated by the plus and minus signs, the rectifiers are connected in an opposite manner relative to each other to secure potential variations of opposite polarity at the junction points between each rectifier and its associate series resistance. Further resistances 58 and 59 are shown connected across the rectifiers and associate voltage drop resistors and by-pass condensers 60 and 61 are connected across the voltage drop resistors 56 and 57, respectively. In this manner a steady potential drop is obtained across the resistors 56 and 57 varying in accordance with the receiving field strength or carrier amplitude of the modulated signal energy. The potential variations at the junction between rectifier 54 and series resistance 56 are applied through a drop resistance to the control grid of the amplifying valve 25 to secure automatic volume or gain control of the ordinary type known in radio receivers. The potential variations at the junction between the rectifier 55 and the series resistance 57 of opposite polarity are applied to the control grid 8 of the reaction or selectivity control valve 6 to provide automatic selectivity and gain control as described by the invention. By proper adjustment of the circuit constants, the effect of the additional gain control of the valve 6 may be substantially balanced by the gain control provided by valve 25 in such a manner that the gain of the receiver remains substantially constant and a pure selectivity control is obtained by valve 6. However, it is understood that any desired relative rate of variation of selectivity and gain may be obtained by the proper adjustment of circuit constants and choice of elements such as valves, resistors, etc., to suit any existing requirements.

Figure 12:
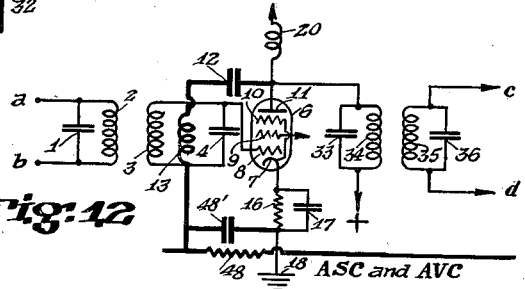
Figure 12 illustrates a modification of the basic inventive circuit according to Figure 1.

It is understood that a selectivity control as described by the invention may be obtained with a single regenerative circuit of the orthodox type in place of a double regenerated circuit illustrated in the preceding figures. Such a system is shown in Figure 12 which differs from Figure 1 by the orthodox coupling of the tuned grid circuit 3, 4, by the coupling of the feedback inductance 13 with the inductance 3 of the resonant grid circuit and the provision of means similar as described in the previous figures for supplying an AVC and ASC biasing potential applied to the control grid of the reaction valve.

It has been found that in automatic selectivity control systems of the type described, very small biasing potentials such as from two to three volts are sufficient to produce substantial changes in selectivity and gain and that the operation is characterized by a high sensitivity and stability.

Figure 13:
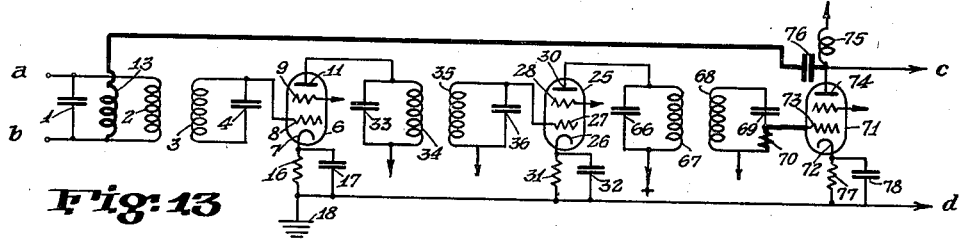
Figures 13 and 14 show further modifications of regenerative systems in accordance with the invention.

Figure 13 illustrates a further modification of the invention wherein the regeneration takes place from the output of one valve to the input of a preceding valve. In the example illustrated three amplifying stages are shown in cascade comprising valves 6, 25 and 71, the latter having a cathode 72, a control grid 73, an anode 74, and a biasing resistance 77 shunted by condenser 78 in the cathode-to-ground lead. The valves are coupled through resonant transformers similar as described in the previous figures. Item 70 is a resistance in series with the condenser 69 of the last resonant circuit for supplying the control potential for the reaction valve similar as described in the previous figures. The feedback circuit is connected between the anode of the last valve 71 and the lower or ground terminal of the primary 2 of the resonant input transformer associated with the first valve. The feedback circuit is shown to include a condenser 76 and inductance or tickler coil 13 similar as in the preceding figures. Item 75 is a choke coil connected between the anode of valve 71 and the positive terminal of the high tension or anode supply source.

Figure 14:
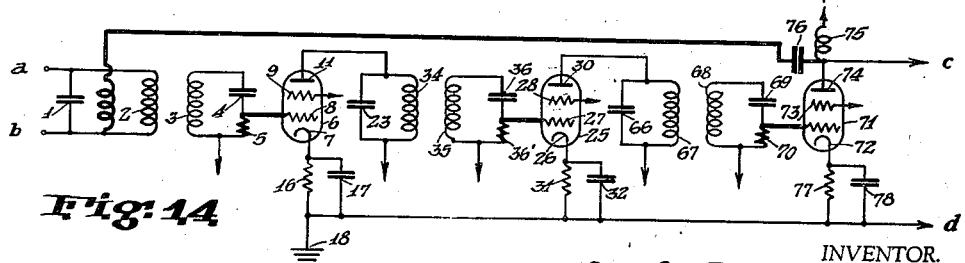

Figure 14 differs from Figure 13 by the fact that the anode current of each valve is in phase quadrature with respect to the grid current of the same valve whereby the tendency to oscillate of any of the valves by stray couplings between the anode and grid circuits or the like is substantially eliminated. For this purpose, the input or grid circuits of the separate valves include a series resistance 5, 36' and 70 respectively similar as shown in the basic circuit in Figure 1, serving to produce a control potential drop applied to the associate grid-cathode path. It can be shown that by adjusting the amount of regeneration to a limit value the resistance in all the selecting circuits become simultaneously zero thus assuring maximum gain and selectivity of the entire system.

As will be evident from the above, while I have described my invention with specific reference to the arrangements and circuits shown in the drawings presented herein for illustration, the invention is susceptible of numerous modifications and variations differing from the embodiments illustrated and coming within its broader scope and spirit as defined by the appended claims.

I claim:

1. In combination with a source of modulated carrier signals, an amplifying valve, a resonant network connected said source to the input of said valve, said network comprising a pair of mutually coupled resonant circuits, a feedback circuit from the output of said valve to the first resonant circuit, means to cause the feedback currents to be of such phase relation to the signals in said first circuit so as to vary the apparent mutual reactance between said resonant circuits, a second amplifying valve connected to the output of said network and means for simultaneously increasing the gain of said first valve while decreasing the gain of said second valve and vice versa.

2. In combination with a source of modulated carrier signals, a first amplifying valve, a resonant network connecting said source to said valve, said network comprising a pair of mutually coupled resonant circuits, a feedback circuit from the output of said valve to said first resonant circuit, means to cause the feedback currents in said first circuit to have a phase relative to the signals therein so as to vary the apparent mutual reactance between said resonant circuits, a second amplifying valve connected to the output of said network, means for generating a pair of steady control potentials varying oppositely and in accordance with the amplitude of the unmodulated component of said signals, and further means for applying each of said last mentioned control potentials to a gain controlling element of each of said valves to increase the gain of one valve and simultaneously decrease the gain of the other valve and vice versa.

JOZEF PLEBANSKI.